Nov. 25, 1924.
E. S. DEWEY
1,516,589
DEVICE FOR REMOVING STORAGE BATTERIES FROM VEHICLES
Filed April 10, 1924
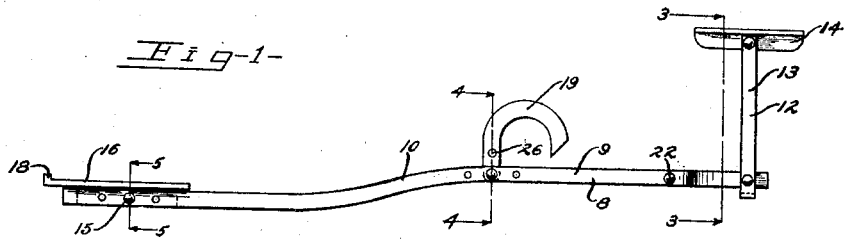
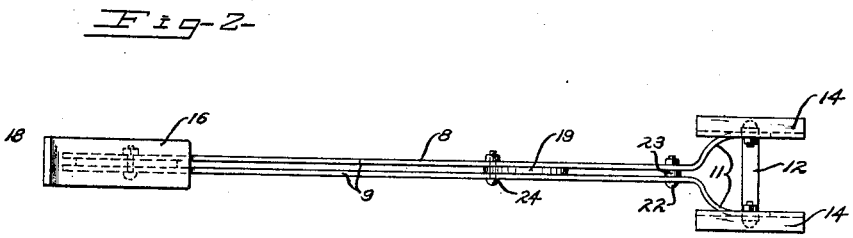
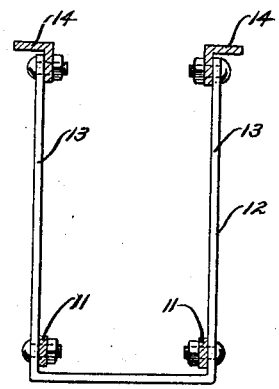
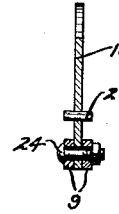
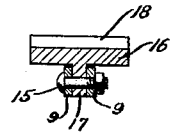
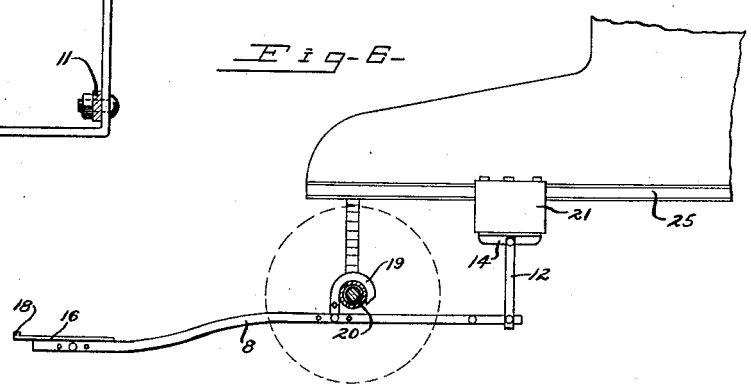
INVENTOR.
Edward S. Dewey,
BY Morsell, Keeney & Morsell
ATTORNEYS.

Patented Nov. 25, 1924.

1,516,589

UNITED STATES PATENT OFFICE.

EDWIN S. DEWEY, OF MADISON, WISCONSIN.

DEVICE FOR REMOVING STORAGE BATTERIES FROM VEHICLES.

Application filed April 10, 1924. Serial No. 705,660.

*To all whom it may concern:*

Be it known that I, EDWIN S. DEWEY, a citizen of the United States, and resident of Madison, in the county of Dane and State of Wisconsin, have invented new and useful Improvements in Devices for Removing Storage Batteries from Vehicles, of which the following is a description, reference being had to the accompanying drawings, which are a part of this specification.

This invention relates to improvements in devices for removing storage batteries from motor vehicles.

Storage batteries are carried in motor vehicles, especially automobiles of a well known make, in rather inaccessible places and as it has heretofore been necessary to exert a direct upward pull on the batteries in removing them, the removing operation is rendered extremely difficult because of the location of the batteries.

It is one of the objects of the present invention to overcome the above mentioned difficulty by providing a device which will lift a storage battery from its container in a motor vehicle by engaging the lower surface of the battery and exerting an upward thrust thereon.

A further object of the invention is to provide a device of the class described which is easily and conveniently operated by one person standing in an upright position.

A further object of the invention is to provide a device of the class described which is foot operated and does not require a great amount of force or pressure.

A further object of the invention is to provide a device of the class described which is of very simple construction, is inexpensive to manufacture, is strong and durable, and is well adapted for the purpose described.

With the above and other objects in view, the invention consists of the improved storage battery removing device and its parts and combinations as set forth in the claims, and all equivalents thereof.

In the accompanying drawing in which the same reference characters indicate the same parts in all of the views:

Fig. 1 is a side view of the improved storage battery removing device;

Fig. 2 is a plan view thereof;

Fig. 3 is an enlarged sectional view taken on line 3—3 of Fig. 1;

Fig. 4 is an enlarged sectional view taken on line 4—4 of Fig. 1;

Fig. 5 is an enlarged sectional view taken on line 5—5 of Fig. 1; and

Fig. 6 is a fragmentary view of the rear end of an automobile showing the device applied thereto to remove a storage battery.

Referring now more particularly to the drawing, it will be seen that the numeral 8 indicates the improved battery removing device. The device comprises a pair of complementary, elongated members 9 preferably formed of strap iron with a slight double bent portion, as at 10, while the inner end portions 11 of the members 9 are curved away from each other, as shown in Fig. 2. The members 9 are positioned adjacent each other and are firmly secured together by means hereinafter to be explained. Pivotally secured to the curved portions 11 is a U-shaped bracket member 12 and the upper extremities of the arms 13 thereof pivotally carry battery engaging members 14. The members 14 are preferably formed of angle iron and have flat upper faces to engage and support a motor vehicle storage battery, as shown in Fig. 6.

The outer end portions of the members 9 have firmly secured thereto by bolt means 15, a pressure plate member 16, the same being preferably formed of T-iron with the portion 17 thereof interposed and held between the members 9, as shown in Fig. 5. The pressure plate affords means for operating the device and the rear thereof may be formed with an upstanding portion 18 to prevent a person's foot from slipping from the plate.

Medially of the extremities of the members 9, a hook member 19 is interposed and pivotally secured therebetween. The hook member 19 is positioned so that the distance between it and the U-shaped member 12 is equal to the horizontal distance between the rear axle 20 and the battery container 21 of a motor vehicle, particularly that of a well known make of automobile, and the device is balanced so that the portion between the hook and the pressure plate is slightly heavier than the inner end portion.

A bolt 22 passes through the members 9, adjacent the curved portions 11 thereof and the members are correctly spaced by means of a washer 23. Obviously, the hook member 19 and the portion 17 of the pressure plate also serve to space the members 9, and the bolts 15 and 24 not only serve to secure the members 16 and 19 to the members 9, but also secure said members 9 together.

In use, the hook portion 19 of the device is hung on the rear axle of a vehicle, as shown in Fig. 3, and the portions 14 may be brought into juxtaposition with the lower surface of the battery to be removed from the vehicle. The operator will then press his foot downwardly on the pressure plate 16 and the members 9 will pivot on the bolt 24, the inner end of the device carrying the U-shaped member 12 being forced upwardly and the battery will be lifted thereby until it is above the level of the vehicle chassis 25 and partially removed from the battery container 21. The operator may then reach forward and easily and conveniently manually remove the battery from the vehicle. It should be observed that the hook member 19 is provided with a transverse pin 26 which limits the pivotal movement of the device by abutting against the upper edges of the members 9. Furthermore, the members 14 will in use always assume a position parallel to the under surface of the battery. This is due to the pivotal connection between said members 14 and the arms 13 of the member 12. The pivotal movement of the members 14 is limited by the fact that they will strike against the upper corners of the arms 13 of the member 12. Obviously, the U-shaped member 12 will at all times maintain a vertical position due to its pivotal connections. Also, its movement is limited by the lower portion thereof which will strike the lower edges of the portions 11.

From the foregoing description it will be seen that the improved storage battery removing device is of very simple and novel construction, and is well adapted for the purpose set forth.

What I claim as my invention is:

1. An automobile storage battery removing device, comprising an elongated frame member of bifurcated form, a U-shaped member pivotally secured to the bifurcated end portions thereof, battery engaging members pivotally secured to the upper end portions of the arms of the U-shaped member, a foot pressure plate secured to the opposite end of the frame member, and means for securing the device to a portion of an automobile, said means being pivotally secured to the frame member medially of its extremities.

2. A device of the class described, comprising a pair of complementary, elongated, strap iron frame members secured together and formed with a medial double bent portion and outwardly diverging inner end portions, a U-shaped strap iron member pivotally secured to the end portions of the frame diverging inner end portions, battery engaging members formed of angle iron and pivotally secured to the upper end portions of the U-shaped member, a foot pressure plate formed of T-iron and having its mid-portion bolted between the outer end portions of the frame members, and hook means for suspending the device from the rear axle of an automobile, said hook means being pivotally secured to the frame member medially of its extremities and provided with a transverse pin to abutt against said frame member to limit the pivotal movement thereof, the entire device being arranged so that pressure on the foot plate will raise the inner end portion of the frame and the battery engaging members carried thereby to lift a storage battery from its container within an automobile.

3. An automobile storage battery removing device, comprising an elongated frame member, an upstanding member pivotally secured to one end thereof, a battery engaging member pivotally secured to the upper end of the upstanding member, and means for securing the device to a portion of an automobile, said means being pivotally secured to the frame member medially of its extremities.

In testimony whereof, I affix my signature.

EDWIN S. DEWEY.